Aug. 26, 1930.  A. LAIST  1,774,333
BLOWING SLAGS AND THE LIKE
Filed June 11, 1928  2 Sheets-Sheet 1

INVENTOR
ALEX LAIST.
BY
Anthony Ulina, ATTORNEY

Aug. 26, 1930.  A. LAIST  1,774,333
BLOWING SLAGS AND THE LIKE
Filed June 11, 1928  2 Sheets-Sheet 2

INVENTOR
ALEX LAIST.
BY
Anthony Usina, ATTORNEY

Patented Aug. 26, 1930

1,774,333

UNITED STATES PATENT OFFICE

ALEX LAIST, OF HELENA, MONTANA, ASSIGNOR TO ANACONDA COPPER MINING COMPANY, A CORPORATION OF MONTANA

BLOWING SLAGS AND THE LIKE

Application filed June 11, 1928. Serial No. 284,462.

In an application of Garred No. 181,979 filed April 8, 1927, there is described an apparatus and process of recovering zinc and other metals from slags and the like by forcing through the latter a mixture of finely divided fuel and air, passing the fume to a cooling chamber and collecting the zinc or other metal oxide therein. The conditions are very destructive of the ordinary linings and it has been proposed in the Garred application to use water cooled walls, with a bottom of refractory material.

In the practice of the process it has been found that the zinc extraction, though high on the first day, became gradually less as the process is continued. I have discovered that this is due to the gradually increasing quantity of slag below the level of the tuyères, and, therefore, beyond the reducing action of the coal; which in turn is due to the corrosion of the bottom of the furnace. And I have remedied this difficulty by providing a bottom which is adapted to maintain its position over a substantially unlimited period of operation.

The accompanying drawings illustrate an embodiment of the invention.

The furnace is illustrated generally at 1, being built up of a series of hollow water-cooled blocks. A hopper 2 high up on the front end is used for introducing the molten slag or other material to be treated. The molten slag is of comparatively slight depth, as indicated, for example, by the dotted line 3. The fume passes upward and through the lateral flue 4 to the bag house for collection of the metal oxides. The air and coal, or other fuel, are forced in through tuyères extended through the opposite side walls. The burning fuel keeps the slag molten, and an amount of fuel is used in excess of that which can be burned. The excess of carbon reduces the zinc oxide to metallic zinc, which vaporizes at the temperature in the converter and is thereafter reoxidized.

Since the process has its chief application to the treatment of slags and similar materials from which most of the metal has already been extracted, a thorough action of the carbon on every part of the charge is important for maximum results. To secure this I not only build the bottom of the furnace as closely below the tuyères as is practicable, but I also circulate water or other cooling fluid through it and close enough to the surface thereof to avoid any such corrosion as would materially alter this condition by leaving a substantial body of the charge below and out of range of the reducing action of the carbon.

Figure 1:
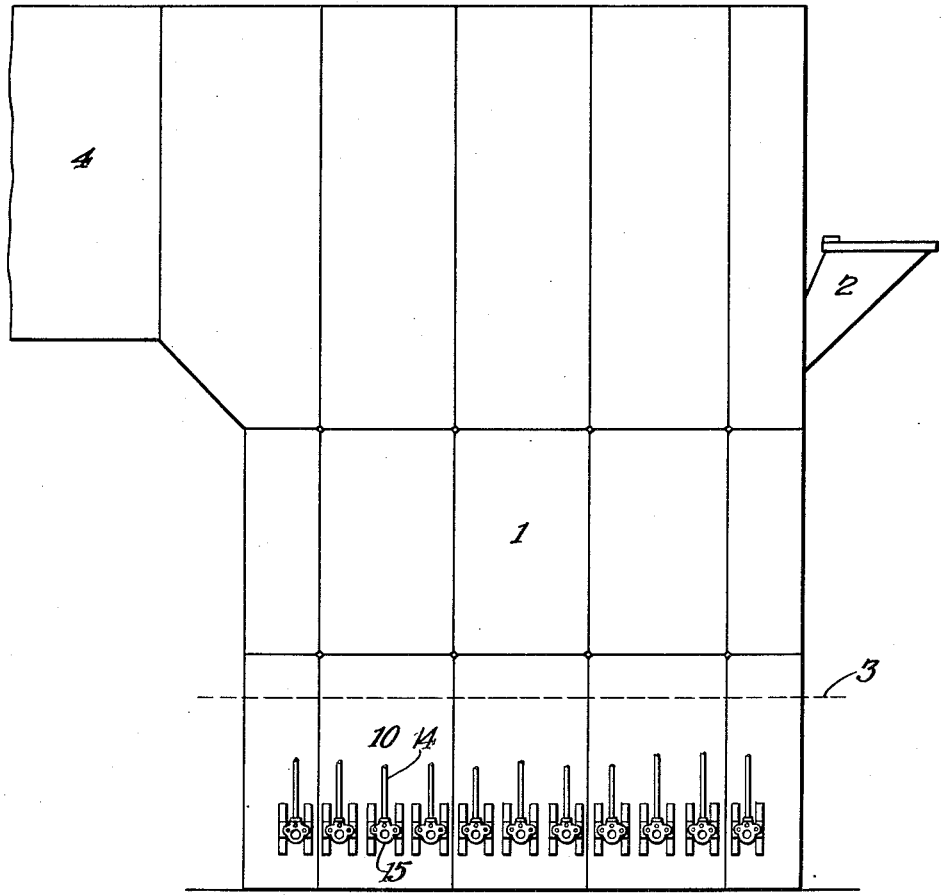
Fig. 1 is a side elevation of the furnace with most of the outside details omitted (these are fully explained in the Garred application)
Figure 2:
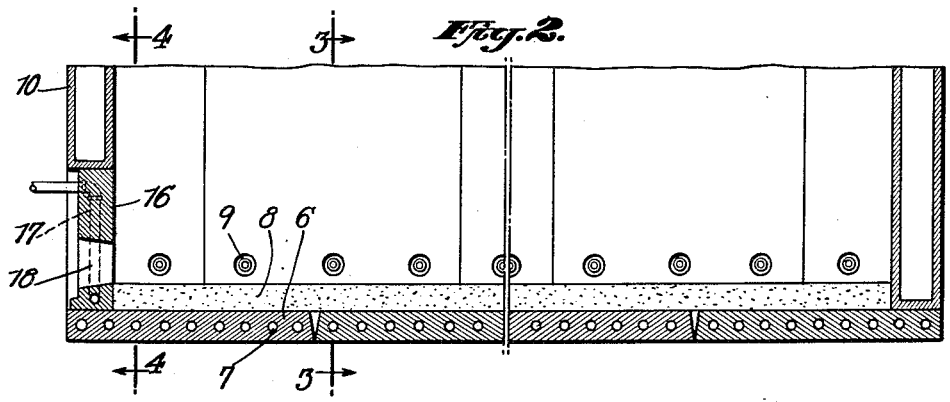
Fig. 2 is a longitudinal section of the lower part of Fig. 1.
Figure 3:
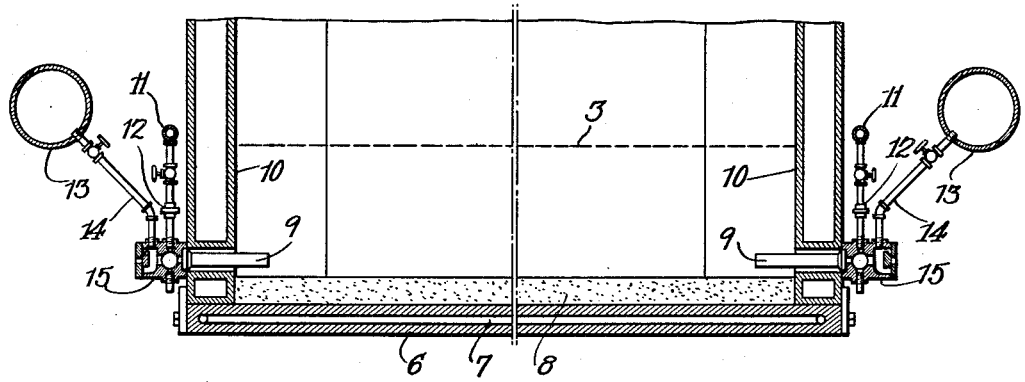
Fig. 3 is a section on the line 3—3 of Fig. 2.
Figure 4:
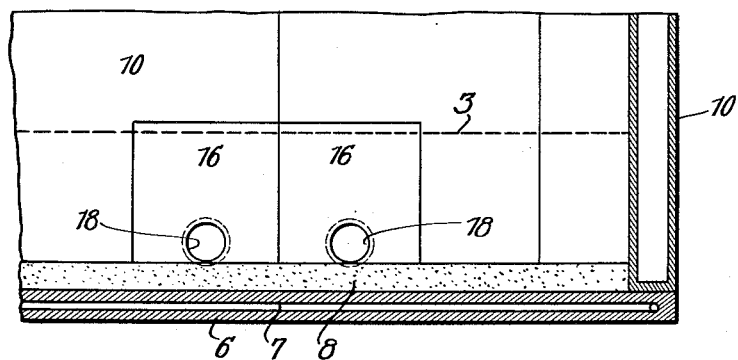
Fig. 4 is a section on the line 4—4 of Fig. 2.

The bottom, as shown in Figs. 2, 3 and 4, is made up of cast iron plates 6 with pipes 7 carried therein for circulation of water. These plates may be, for example, about four and one-quarter inches thick, with one inch pipes embedded in the centre. On these is a layer 8 of refractory material about four inches deep at the sides and three and one-half inches deep at the centre. The top of this initial bottom is about one inch below the level of the tuyères 9.

The tuyères pass through holes in the lower portions of the water-cooled plates 10 of which the side and end walls of the furnace are built.

Fig. 3 shows a powdered coal feed pipe 11 with branches 12 leading to the tuyère and a bustle pipe 13 for air with branches 14. The two pipes 12 and 14 lead to each tuyère through a fitting 15, described in detail in the Garred application.

At one end there are set into the lower part of the wall sections 10 plates 16 (Figs. 2 and 4) which are water cooled by means of embedded pipes 17 and which have tap holes 18 for blowing off the barren slag, when desired.

The layer of magnesite or other refractory material 8 will be corroded away by the initial operations down to within one or two inches of the water-cooled plates. But it will be practically stable at this level because of the cooling effect of the plates 6, leaving a depth of only two or three inches clear below the tuyères.

Or the bottom can be made initially of the cooled plates 6 alone with a space of about four inches between its upper level and the level of the tuyères. In operation it will soon accumulate one or two inches of chilled slag, which will carry its effective level as close to the tuyère level as is necessary for efficiency. And this level will be maintained over an indefinite period of time.

The artificial cooling of the bottom is not necessary for the protection of it. Such protection would come from the building up of the slag if there were no cooling of the bottom. The value of the invention lies in the increased recovery of metal from the slag.

Various modifications in detail and in the arrangement of the parts may be made by those skilled in the art without departing from the invention as defined in the following claims:

1. A furnace of the character described for treating molten slags or the like with fuel and air to recover metal therefrom, said furnace having tuyères in the lower part of it and means for feeding fuel and air through said tuyères and having a bottom which is artificially cooled so as to maintain its level in operation immediately below the level of the tuyères and to maintain the charge within range of the reducing action of the fuel.

2. A furnace of the character described for treating molten slags or the like with fuel and air to recover metal therefrom, said furnace having tuyères in the lower part of it and means for feedng fuel and air through said tuyères and having a bottom of metal plates with means for circulating a cooling medium through them, the level of such plates being at such a slight distance below the tuyères that the chilled material thereon will be maintained in operation at a level immediately below the tuyères and to maintain the charge within range of the reducing action of the fuel.

3. A furnace of the character described for treating molten slags or the like with fuel and air to recover metal therefrom, said furnace having tuyères in the lower part of it and means for feeding fuel and air through said tuyères and having a bottom of metal plates with means for circulating a cooling medium through them and a layer of refractory material on said plates built up to a level immediately below the tuyères so as to maintain the charge within range of the reducing action of the fuel.

4. A furnace of the character described for treating molten slags or the like with fuel and air to recover metal therefrom, said furnace having side walls which are artificially cooled to protect them from corrosion, having tuyères extending through the lower part of said side walls and means for feeding fuel and air through said tuyères and having a bottom which is artificially cooled so as to maintain its level in operation immediately below the level of the tuyères and thus limit to a slight quantity the accumulation of slag below the reducing zone.

In witness whereof, I have hereunto signed my name.

ALEX LAIST.